United States Patent
Ke

(10) Patent No.: US 12,325,214 B2
(45) Date of Patent: Jun. 10, 2025

(54) HIGH-BARRIER LAMINATED TPU CAR FILM AND PREPARATION METHOD THEREFOR

(71) Applicant: QUAD FILM LTD, Las Vegas, NV (US)

(72) Inventor: Ni Ke, Las Vegas, NV (US)

(73) Assignee: QUAD FILM LTD

( * ) Notice: Subject to any disclaimer, the term of this patent is extended or adjusted under 35 U.S.C. 154(b) by 0 days.

(21) Appl. No.: 18/803,583

(22) Filed: Aug. 13, 2024

(65) Prior Publication Data
US 2024/0399723 A1  Dec. 5, 2024

(30) Foreign Application Priority Data

May 29, 2024  (CN) .......................... 202410679798.0
May 29, 2024  (CN) .......................... 202410679806.1

(51) Int. Cl.
*B32B 27/08*  (2006.01)
*B32B 7/12*  (2006.01)
*B32B 27/40*  (2006.01)

(52) U.S. Cl.
CPC ................ *B32B 27/08* (2013.01); *B32B 7/12* (2013.01); *B32B 27/40* (2013.01);
(Continued)

(58) Field of Classification Search
CPC .......... B32B 27/08; B32B 7/12; B32B 27/40; B32B 2250/03; B32B 2255/205;
(Continued)

(56) References Cited

U.S. PATENT DOCUMENTS

| 2012/0040178 A1 | 2/2012 | Hanaki et al. |
| 2012/0045641 A1 | 2/2012 | Hanaki et al. |

(Continued)

FOREIGN PATENT DOCUMENTS

| CN | 106435475 A | * | 2/2017 | ......... C23C 14/0036 |
| CN | 109971382 A | * | 7/2019 | |

(Continued)

OTHER PUBLICATIONS

Machine translation of CN 106435475 A (Year: 2017).*

(Continued)

*Primary Examiner* — Callie E Shosho
*Assistant Examiner* — Steven A Rice

(57) ABSTRACT

An intelligent movable and retractable bed frame includes an upper bed frame and a bottom bed frame; the upper bed frame is hinged with the bottom bed frame; the upper bed frame includes an upper frame rod and an upper frame crossarm with one end connected to the upper frame rod; the upper frame crossarm is connected with an upper frame extending stand which can transversely move along the upper frame crossarm; the bottom bed frame includes a bottom frame rod and a bottom frame crossarm with one end connected to the bottom frame rod; the bottom frame crossarm is connected with a bottom frame extending stand which can transversely move along the bottom frame crossarm; and the upper frame extending stand is hinged with the bottom frame extending stand.

8 Claims, 2 Drawing Sheets

(52) U.S. Cl.
CPC ....... *B32B 2250/03* (2013.01); *B32B 2255/10* (2013.01); *B32B 2255/205* (2013.01); *B32B 2307/412* (2013.01); *B32B 2307/418* (2013.01); *B32B 2307/7376* (2023.05); *B32B 2605/006* (2013.01)

(58) Field of Classification Search
CPC ........ B32B 2307/412; B32B 2307/418; B32B 2307/7376; B32B 2605/006; G02B 5/208
USPC ...................................................... 428/423.1
See application file for complete search history.

(56) References Cited

U.S. PATENT DOCUMENTS

2012/0058331 A1    3/2012   Hanaki et al.
2023/0070703 A1*   3/2023   Tsou ..................... G02B 5/208

FOREIGN PATENT DOCUMENTS

CN      110228236 A  *  9/2019   ........... B32B 17/064
CN      112552833 A  *  3/2021

OTHER PUBLICATIONS

Machine translation of CN 109971382 A (Year: 2019).*
Machine translation of CN 110228236 A (Year: 2019).*
Machine translation of CN 112552833 A (Year: 2021).*

* cited by examiner

| | 340nm | 550nm | 950nm | 1400nm | Stretchability (mm) | Weather resistance (h) |
|---|---|---|---|---|---|---|
| Example 1 | 99.5 | 72 | 86% | 97% | 122 | 200 |
| Patent CN 109971382B | 99.5 | 71 | 85% | 96% | 130 | 200 |

FIG. 2

HIGH-BARRIER LAMINATED TPU CAR FILM AND PREPARATION METHOD THEREFOR

TECHNICAL FIELD

The present disclosure relates to the technical field of thermal insulation films, and particularly to a high-barrier laminated TPU car film used for cooling and thermal insulation of car bodies or building surfaces and a preparation method therefor.

BACKGROUND

A film conventionally pasted onto cars and building glass, often referred to as a window film, is used to provide the functions of thermal insulation and UV protection. At present, the traditional window film cannot be pasted outside the automotives and outdoor due to its limitations in scratch resistance, acid rain resistance, surface oxidation and bendability, and can only be pasted onto the inside of car glass and building glass. With the development of new energy vehicles, many vehicle models have full-size glass roofs which are generally semi-transparent or transparent glass. After the sunlight passes through the glass roof, the temperature inside the car is increasingly raised, and the electricity consumption and carbon emissions are greatly increased during the use in order to maintain an appropriate temperature inside the car. Furthermore, the roof itself is designed into a shape with a specific curvature according to the appearance of the car. Usually, the dual-silver thermal insulation sunshade film on the market is made of a PET material, so it is heated, baked and shaped according to the appearance curvature of the glass before installation, but its deformation should not be too large; since the car roof canopy with a shape of special curvature has a too large curvature, the dual-silver thermal insulation sunshade film made of PET material cannot obtain a shape with a large curvature or large radian by heating and baking, and therefore the conventional dual-silver thermal insulation sunshade film cannot be well pasted onto the car roof canopy having a large curvature or great radian without affecting beauty. The thermal insulation material of the nano thermal insulation TPU car clothing film commonly circulated on the market is an organic or inorganic heat absorbing and barrier material, the organic or inorganic heat absorbing and barrier material is ground to a micrometer level to be added into a pressure-sensitive adhesive in a certain proportion and installed on one side of TPU through a roller coating or scraping process. Because the thermal insulation material is a heat absorbing material, the pasting of the thermal insulation material onto the outside of the car body or car glass canopy cannot effectively barrier the infrared rays in sunrays, and a large amount of infrared rays are absorbed on the surface of the nano thermal insulation TPUT car clothing film to result in the too high temperature of the material itself, especially, if the nano thermal insulation TPU car clothing film is installed outside the car glass canopy at an area with a high outdoor temperature, the canopy has the risk of explosion, causing the insufficient safety of cars.

SUMMARY

In view of the defects in the prior art, the present disclosure provides a high-barrier laminated TPU car film and a preparation method therefor. The high-barrier laminated TPU car film can be used for the surfaces of cars or buildings, thereby playing roles in insulation, cooling and energy conservation in the environment exposed to sunlight.

Provided is a high-barrier laminated TPU car film, comprising the following layers stacked in turn:

(1) a first substrate layer having a thickness of 2-188 μm, preferably 2-155 μm, further preferably 2-100 μm, and the material of the first substrate layer being TPU (thermoplastic polyurethane elastomer), TPH (thermoplastic elastomer), PET or PP, wherein the TPU material is a thermoplastic polyurethane elastomer which is a polymer material polymerized by jointly reacting diphenylmethane diisocyanate (MDI) or toluene diisocyanate (TDI) with a macromolecular polyol and a low molecular polyol (a chain extender); the TPU material has a wide hardness range, wear resistance, oil resistance, transparency and good elasticity, and is widely applied to the fields of daily necessities, sports equipment, toys, decorative materials and the like; the TPU material comprises the main components: polyether ether ketone, polyester and isocyanate; the TPH material is also a thermoplastic elastomer which is an elastic material with high strength, high water resistance and high wear resistance, and can withstand extreme temperature, pressure and chemical corrosion while maintaining good physical properties; the PET film is referred to as a high temperature-resistant polyester film with excellent physical properties, chemical properties, size stability, transparency, recyclability and mechanical properties, and it has the most strongest roughness in all the thermoplastic plastics, and tensile strength and impact strength much higher than those of general films, moreover, the PET film has good tension and stable size, as well as good heat/cold resistance and good chemical and oil resistance; the PP film is divided into an unstretched polypropylene film which comprises a blown polypropylene film (IPP) produced by an extrusion blow molding method and an extruded cast polypropylene (CPP) produced by a T-mold method and a biaxially-oriented polypropylene (BOPP) film which is a new film developed for the purpose of replacing glass paper and has the characteristics of high mechanical strength, good toughness, good transparency, good glossiness and the like. Preferably, the material of the first substrate layer is thermoplastic elastomer TPU or TPH, more preferably, the material of the first substrate layer is TPU;

(2) a second substrate layer having a thickness of 2-188 μm, preferably 2-155 μm, further preferably 2-100 μm, more further preferably 2-16 μm, and the material of the second substrate layer being TPU, TPH, PET or PP, wherein the characteristics of the material is the same as those of the first substrate layer; preferably, the material of the second substrate layer is PET (polyethylene terephthalate, i.e., a high temperature resistant polyester film);

(3) a dual-silver magnetron layer having a thickness of 94.4-315 nm (i.e., 0.094-0.315 μm), and the dual-silver magnetron layer consisting of the following layers stacked in turn:
a first high refraction index layer having a thickness of 10-60 nm;
a first metal oxide layer having a thickness of 2-30 nm;
a first silver layer having a thickness of 5-20 nm;
a first barrier layer having a thickness of 0.2-10 nm;
a second high refraction index layer having a thickness of 50-75 nm;

a second metal oxide layer having a thickness of 2-30 nm;
a second silver layer having a thickness of 5-20 nm;
a second barrier layer having a thickness of 0.2-10 nm;
a third high refraction index layer having a thickness of 20-60 nm;

(4) a third substrate layer having a thickness of 2-188 μm, preferably 2-155 μm, further preferably 2-100 μm, and the material of the third substrate layer being TPU (thermoplastic polyurethane elastomer) or TPH (thermoplastic polyurethane elastomer) or PET (polyethylene terephthalate) or PP; wherein the material characteristics of the third substrate layer are the same as those of the first substrate layer, preferably the material of the third substrate layer is TPU.

Further, the materials of the first high refraction index layer, the second high refraction index layer and the third high refraction index layer are all one or more of $TiO_2$ (titanium dioxide), $Ti_3O_5$ (titanium pentoxide), $Ta_2O_5$ (tantalum pentoxide), $Nb_2O_5$ (niobium pentoxide) and SiN (silicon nitride).

Preferably, the materials of the first high refraction index layer, the second high refraction index layer and the third high refraction index layer are all $Ti_3O_5$, with a refraction index of 2.2-2.5, a refractive index of 2.25 n–2.35 n at the wavelength of 550 nm and a transparent area of 350-1100 nm.

Further, the materials of the first metal oxide layer and the second metal oxide layer are both one or more of AZO (aluminum zinc oxide, also called aluminum doped zinc oxide), ATO (antimony tin oxide, also called antimony doped tin oxide), CTO (cesium tungsten oxide, also called cesium doped tungsten oxide) and ITO (indium tin oxide, also called an indium tin oxide synthetic material); the first metal oxide layer and the second metal oxide layer have a refraction index of 1.95 n–2.05 n at the wavelength of 550 nm.

Preferably, the materials of the first metal oxide layer and the second metal oxide layer are both AZO (aluminum zinc oxide), with a refraction index of 2.02.

Further, the materials of the first barrier layer and the second barrier layer are both nickel.

Further, lamination is achieved between the first substrate layer and the second substrate layer and between the dual-silver magnetron layer and the third substrate layer through an installation glue layer, the material of the installation glue layer is an acrylate pressure-sensitive adhesive, and the installation glue layer has a thickness of 2-35 μm, preferably 6-30 μm, further preferably 10-30 μm, more further preferably 15-25 μm.

Further, the visible light transmittances of the first substrate layer, the second substrate layer and the third substrate layer are ≥89%.

Further, the other side of the third substrate layer can also be coated with a layer of installation pressure-sensitive adhesive and pasted with a release film layer. When in use, the release film layer is torn off so that the high-barrier laminated TPU car film is pasted onto the surface of a car or a building.

Provided is a preparation method for the above high-barrier laminated TPU car film, comprising the following steps:

(1) coating installation glue onto one side of a first substrate layer through a coating process and laminating a second substrate layer; wherein the first substrate layer is a TPU film or a TPH film, preferably, the first substrate later is a TPU film; wherein the second substrate layer is a PET film;

(2) successively sputtering $Ti_3O_5$, AZO, silver, nickel, $Ti_3O_5$, AZO, silver, nickel and $Ti_3O_5$ on one side of the second substrate layer to form a first high reflection index layer, a first metal oxide layer, a first silver layer, a first barrier layer, a second high reflection index layer, a second metal oxide layer, a second silver layer, a second barrier layer and a third high reflection layer, and forming a dual-silver magnetron layer; and (3) evenly coating installation glue onto one side of the third high reflection index layer and pasting a third substrate layer; wherein the third substrate layer is a TPU film, a TPH film or a PET film, preferably, the third substrate layer is the TPU film.

The above-mentioned high-barrier laminated TPU car film can be used for thermal insulation of car metal surfaces, glass surfaces or building surfaces, and pasted on car metal roofs, surface metal plates or building surfaces, thereby greatly improving the thermal insulation performance of cars or buildings to prevent a large amount of heat from being transferred to the interior of cars and buildings under sunlight exposure, and solving the problem of pasting the dual-silver thermal-insulation film on the car panoramic canopy.

The TPU or TPH substrate is characterized by easy stretch, high ductility, high shrinkage and arbitrary bending. When a full TPU or TPH magnetron dual-silver thermal-insulation car clothing film is prepared, the tensile ductility is not controlled within an effective range, which can cause damage to the dual-silver magnetron film. Based on the unique properties of these two substrates that are different from PET substrates, the ductility of the high barrier thermal-insulation car clothing film can be effectively controlled and its characteristics are not affected, through lamination of ultra-thin PET substrate and TPU or PPH.

The present disclosure has the beneficial effects: the high-barrier laminated TPU car film provided by the present disclosure has the effects of energy conservation, cooling and thermal insulation, is thin in thickness and transparent in color, and can be randomly pasted at positions such as car roofs, has a solar barrier rate of ≥86% at the infrared ray of 950 nm, a solar barrier rate of ≥97% at the infrared ray of 1400 nm and a solar barrier rate of ≥99.5% at the ultraviolet ray of 365 nm, and has visible light transmittance of ≥70% (measured with a solar film tester LS182); furthermore, the high-barrier laminated TPU car film provided by the present disclosure has good flexibility and contractility, and is not easy to wrinkle and bubble when being pasted onto the cars. The method for preparing the high-barrier laminated TPU car film provided by the present disclosure is simple in flow procedures, can effectively control the firmness and oxidation resistance of the metal material when sputtered onto the surface of the PET substrate, and any stretching or bending during the preparation does not affect the appearance and thermal insulation effects.

The high-barrier laminated TPU car film of the present disclosure is different from a car clothing film and a preparation method thereof disclosed in patent CN109971382A that to ensure that the function of the magnetron dual-silver film is not damaged by external forces, a PET, PE or OPP transparent polyester film layer is added between two layers of TPU or TPH substrates in the present disclosure so as to effectively control the ductility of the thermal insulation car clothing film and the extension length of the thermal insulation car clothing film, thereby effectively protecting the characteristics of the magnetron dual-silver functional layer. The TPU or TPH material is a thermoplastic elastomer which has the characteristics of good ductility. When the TPU and TPH substrates serve as the magnetron dual-silver film substrate, the extension lengths thereof are not effectively controlled during the construction of the TPC and TPH materials, causing the fracture of the magnetron dual-silver film layer metal wire so as to cause the reduced function of reflecting and obstructing infrared rays for the magnetron dual-silver film. In addition, the silver layer is not effectively protected after the breakage of the dual-silver film layer metal wire, thereby causing the oxidation of the magnetron dual-silver film layer and the failed function of the magnetron dual-silver film. The problem is effectively solved by the film layer structure design and preparation method of the present disclosure.

BRIEF DESCRIPTION OF THE DRAWINGS

FIG. 2 is a comparison diagram showing barrier data, transmittance data and weather resistance data between a high-barrier laminated TPU car film and the existing ordinary car clothing film according to the embodiment of the present disclosure.

Figure 1:
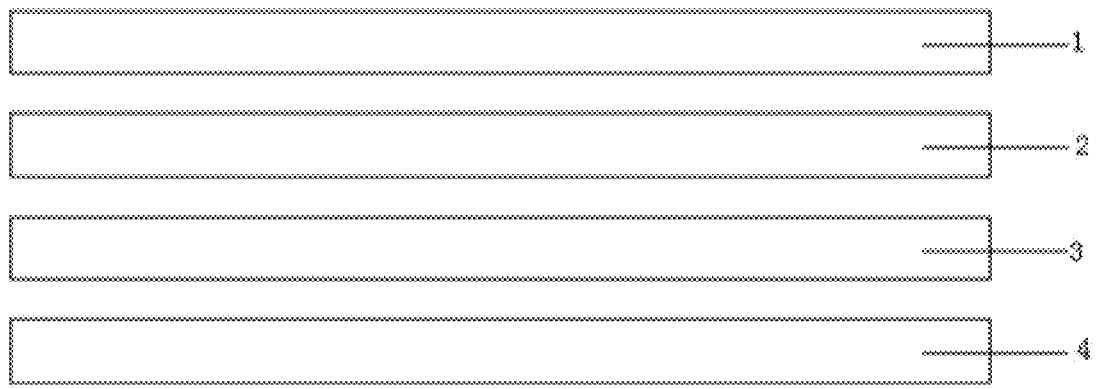
FIG. 1 is a schematic diagram of a cross-sectional structure of a high-barrier laminated TPU car film according to the embodiment of the present disclosure.

Reference number: 1-first substrate layer, 2-second substrate layer, 3-dual-silver magnetron layer, and 4-third substrate layer.

DETAILED DESCRIPTION OF THE EMBODIMENTS

In order to more clearly illustrate the technical feature, purpose and effects of the present disclosure, the specific embodiments of the present disclosure will be described with reference to drawings.

Example 1

Next, the steps for preparing the high barrier laminated TPU car film will be described in detailed:

(1) A flexible and transparent TPU film was provided as a first substrate layer 1.

(2) A flexible and transparent PET film was provided as a second substrate layer 2. The second substrate layer was stretched without deformation under a tension of 250 N-300 N in the process of magnetron sputtering. A pressure-sensitive adhesive with a thickness of 20 μm was coated onto the surface of the second substrate layer, the second substrate layer 2 was coated by roller coating and dried in an oven. The length of the seven-section oven was 4 m each, and the total length of the oven was 28 m. The temperatures were set as follows: 70° C. for the first section, 80° C. for the second section, 90° C. for the third section, 105° C. for the fourth section, 115° C. for the fifth section, 125° C. for the sixth section, and 135° C. for the seventh section. The baking time was 25 m/min. The temperatures of the oven were ranked from low to high to avoid the problem of coating surface drying caused by a too-high initial temperature. The solvent inside the pressure-sensitive adhesive could not be evaporated, resulting in the generation of bubbles and insufficient drying of the coating. The adhesive was dried and laminated onto one side of the first substrate layer 1. The TPU and PET laminated film was obtained as a coating substrate, so as to achieve the magnetron process requirements for sputtering dual silver on the PET film (i.e., the second substrate layer 2).

(3) A dual-silver nine-layer process was performed on the second substrate layer 2 by using a dual-rotating cathode and intermediate-frequency reactive magnetron sputtering method, wherein when the coating film was deposited via magnetron sputtering, the temperatures of all the chambers were constant, and the constant temperature range of all the chambers was −15° C. to 20° C. A mixed gas of argon and oxygen in a volume ratio of 5:1-50:1 was introduced into a corresponding chamber, a sputtering vacuum degree was set as 10-6 Torr, and a stable coating air pressure was 10-3 Torr; the power of the dual-rotating cathode and intermediate-frequency reactive magnetron sputtering was 10 Kw-20 Kw; the power of the single-rotating cathode and direct-current reactive magnetron sputtering was 0.3 Kw-2.5 kw. An optical film system consisted of $Ti_3O_5$, AZO, silver, nickel, $Ti_3O_5$, AZO, silver, nickel, and $Ti_3O_5$. The physical thickness of each layer was 30 nm/15 nm/12 nm/1 nm/65 nm/15 nm/10 nm/1 nm/30 nm, resulting in a dual-silver magnetron film (i.e., a dual-silver magnetron layer 3 was formed).

(4) An installation glue layer was coated onto the dual-silver magnetron layer 3 through coiling type coating of an adhesive wire, during which, the installation glue layer was stretched without deformation under a tension of 250 N-300 N, and a pressure-sensitive adhesive was coated onto the surface of the installation glue layer, the installation glue layer was coated by roller coating and dried in an oven. The length of the seven-section oven was 4 m each, and the total length of the oven was 28 m. The temperatures were set as follows: 70° C. for the first section, 80° C. for the second section, 90° C. for the third section, 105° C. for the fourth section, 115° C. for the fifth section, 125° C. for the sixth section, and 135° C. for the seventh section. The baking time was 25 m/min. The temperatures of the oven were ranked from low to high to avoid the problem of coating surface drying caused by a too-high initial temperature. The solvent inside the pressure-sensitive adhesive could not be evaporated, resulting in the generation of bubbles and insufficient drying of the coating. After drying and removing from the oven, the TPU third substrate layer 4 was pasted through mirror roll pasting so as to obtain a laminated substrate with three layers of pasted substrates. The metal material was insulated from air better and more effectively to avoid oxidation reaction, so as to more further ensure the thermal insulation durability of the cooling and thermal-insulation car clothing film.

(5) An installation glue layer was coated onto the other side of the third substrate layer 4 through coiling coating of an adhesive wire, during which, the installation glue layer was stretched without deformation under a tension of 250 N-300 N, a pressure-sensitive adhesive was coated onto the surface of the installation glue layer, the installation glue layer was coated by roller coating and dried in an oven. The length of the seven-section oven was 4 m each, and the total length of the oven was 28 m. The temperatures were set as follows: 70° C. for the first section, 80° C. for the second section, 90° C. for the third section, 105° C. for the fourth section, 115° C. for the fifth section, 125° C. for the sixth section, and 135° C. for the seventh section. The baking time was 25 m/min. The temperatures of the oven were ranked from low to high to avoid the problem of coating surface drying caused by a too-high initial temperature. The solvent inside the pressure-sensitive adhesive cannot be evaporated, resulting in the generation of bubbles and insufficient drying of the coating. After drying and removing from the oven, a layer of release film was pasted through mirror roll pasting so as to obtain a high-barrier car laminated TPU car film. When in use, the release film layer was torn off so that the high-barrier laminated TPU car film was pasted onto the surface of a car or building.

FIG. 1 is a structural diagram of a high-barrier laminated TPU car film prepared in this example. The high-barrier laminated TPU car film comprised the following layers stacked in turn:

(1) a first substrate layer having a thickness of 50 μm;
(2) a second substrate layer having a thickness of 2 μm;
(3) a dual-silver magnetron layer consisting of a first high refraction index layer, a first metal oxide layer, a first silver layer, a first barrier layer, a second high refraction index layer, a second metal oxide layer, a second silver layer, a second barrier layer and a third high refraction index layer which were stacked in turn, and had a thickness of 30 nm/15 nm/12 nm/1 nm/65 nm/15 nm/10 nm/1 nm/30 nm successively;
(4) a third substrate layer having a thickness of 50 μm.

The high-barrier laminated TPU car film was subjected to visible UV barrier rate, visible light transmittance rate, infrared blocking rate and other data testes respectively. The test results are shown in FIG. 2.

Data measurement was performed using an LS182 solar film measurement instrument. First, the visible light data of air was measured in the absence of a medium, with a transmittance of 100%; then, a 100 mm square high-barrier TPU car film was cut and placed in the measurement position for data measurement. The solar barrier rate at the infrared ray of 950 nm was ≥86%, the solar barrier rate at the infrared ray of 1400 nm was ≥97%, the solar barrier rate at the ultraviolet ray of 365 nm was ≥99.5%, and the visible light transmittance was ≥70%. Moreover, the high-barrier laminated TPU car film effectively controlled the extension length, enhanced the protection of the dual-silver magnetron layer, and reduced the risks of magnetron dual-silver layer oxidation and magnetron dual-silver film function failure caused by the breakage of metal wires in the dual-silver magnetron layer.

The high-barrier laminated TPU car film product can be used for the surfaces of cars or buildings, has the ability to prevent explosion and reflect ultraviolet and infrared heat, plays a role in insulation, cooling, and energy conservation in sunny environments, and at the same time, has multiple effects such as corrosion resistance, scratch resistance, aging resistance and curvature.

Example 2

According to the preparation method in example 1, a different film thickness was selected for preparation in this example. The prepared high-barrier laminated TPU car film comprised the following layers stacked in turn:

(1) a first substrate layer having a thickness of 2 μm;
(2) a second substrate layer having a thickness of 2 μm;
(3) a dual-silver magnetron layer consisting of a first high refraction index layer, a first metal oxide layer, a first silver layer, a first barrier layer, a second high refraction index layer, a second metal oxide layer, a second silver layer, a second barrier layer and a third high refraction index layer which were stacked in turn, and had a thickness of 10 nm/2 nm/5 nm/0.2 nm/50 nm/2 nm/5 nm/0.2 nm/20 nm successively;
(4) a third substrate layer having a thickness of 2 μm.

The high-barrier laminated TPU car film was subjected to visible UV barrier rate, visible light transmittance rate, infrared blocking rate and other data testes respectively. The test results show that the car clothing film has the ability to reflect ultraviolet and infrared heat.

Example 3

According to the preparation method in example 1, a different film thickness was selected for preparation in this example. The prepared high-barrier laminated TPU car film comprised the following layers stacked in turn:

(1) a first substrate layer having a thickness of 188 μm;
(2) a second substrate layer having a thickness of 188 μm;
(3) a dual-silver magnetron layer consisting of a first high refraction index layer, a first metal oxide layer, a first silver layer, a first barrier layer, a second high refraction index layer, a second metal oxide layer, a second silver layer, a second barrier layer and a third high refraction index layer which were stacked in turn, and had a thickness of 60 nm/30 nm/20 nm/10 nm/75 nm/30 nm/20 nm/10 nm/60 nm successively;
(4) a third substrate layer having a thickness of 188 μm.

The high-barrier laminated TPU car film was subjected to visible UV barrier rate, visible light transmittance rate, infrared blocking rate and other data testes respectively. The test results show that the car clothing film has the ability to reflect ultraviolet and infrared heat.

The above descriptions are only illustrative specific embodiments of the present disclosure, but not intended to limit the scope of the present disclosure. Any equivalent changes, modifications and combinations made by those skilled in the art without departing from the concepts and principles of the present disclosure shall fall within the scope of protection of the present disclosure.

What is claimed is:

1. A high-barrier laminated thermoplastic polyurethane (TPU) car film, comprising the following layers stacked in turn:
   (1) a first substrate layer having a thickness of 2-10 μm, and the material of the first substrate layer is TPU or thermoplastic elastomer (TPH);
   (2) a second substrate layer having a thickness of 2-16 μm, and the material of the second substrate layer is polyethylene terephthalate (PET);
   (3) a dual-silver magnetron layer consisting of the following layers stacked in turn:
   a first high refraction index layer having a thickness of 10-60 nm;
   a first metal oxide layer having a thickness of 2-30 nm;
   a first silver layer having a thickness of 5-20 nm;
   a first barrier layer having a thickness of 0.2-10 nm;
   a second high refraction index layer having a thickness of 50-75 nm;
   a second metal oxide layer having a thickness of 2-30 nm;
   a second silver layer having a thickness of 5-20 nm;
   a second barrier layer having a thickness of 0.2-10 nm;
   a third high refraction index layer having a thickness of 20-60 nm;
   (4) a third substrate layer having a thickness of 2-100 μm; and the material of the third substrate layer being TPU, TPH, or PET.

2. The high-barrier laminated TPU car film according to claim 1,
   wherein the materials of the first high refraction index layer, the second high refraction index layer, and the third high refraction index layer are all one of $TiO_2$, $Ti_3O_5$, $Ta_2O_5$, $Nb_2O_5$, and SiN.

3. The high-barrier laminated TPU car film according to claim 2, wherein the materials of the first high refraction index layer, the second high refraction index layer, and the third high refraction index layer are all $Ti_3O_5$, with a refraction index of 2.2-2.5 and a region of transparency for light having wavelength of 350-1100 nm.

4. The high-barrier laminated TPU car film according to claim 1, wherein the materials of the first metal oxide layer and the second metal oxide layer are both one of aluminum zinc oxide (AZO), antimony tin oxide (ATO), cesium tungsten oxide (CTO), and indium tin oxide (ITO).

5. The high-barrier laminated TPU car film according to claim 4, wherein the materials of the first metal oxide layer and the second metal oxide layer are both AZO, with a refraction index of 1.95 n-2.05 n at a wavelength of 550 nm.

6. The high-barrier laminated TPU car film according to claim 1, wherein the materials of the first barrier layer and the second barrier layer are both nickel.

7. The high-barrier laminated TPU car film according to claim 1, wherein the visible light transmittances of the first substrate layer, the second substrate layer and the third substrate layer are at least 89%.

8. A preparation method for the high-barrier laminated TPU car film according to claim 1, comprising the following steps:
   (1) coating installation glue on one side of the first substrate layer through a coating process and laminating the second substrate layer;
   (2) successively sputtering $Ti_3O_5$, AZO, silver, nickel, $Ti_3O_5$, aluminum zinc oxide (AZO), silver, nickel and $Ti_3O_5$ on one side of the second substrate layer to form the first high refraction index layer, the first metal oxide layer, the first silver layer, the first barrier layer, the second high refraction index layer, the second metal oxide layer, the second silver layer, the second barrier layer, and the third high refraction index layer; and
   (3) evenly coating installation glue on one side of the third high reflection index layer and pasting the third substrate layer.

\* \* \* \* \*